United States Patent
Tu et al.

(10) Patent No.: US 7,089,043 B2
(45) Date of Patent: Aug. 8, 2006

(54) SELF-RECHARGEABLE PORTABLE TELEPHONE

(75) Inventors: Yu-Ta Tu, Hsinchu Hsien (TW); Show-Jong Yeh, Hemet, CA (US)

(73) Assignee: Sunyen Co., Ltd., Taipei (TW)

( * ) Notice: Subject to any disclaimer, the term of this patent is extended or adjusted under 35 U.S.C. 154(b) by 122 days.

(21) Appl. No.: 10/410,159

(22) Filed: Apr. 10, 2003

(65) Prior Publication Data

US 2003/0232627 A1    Dec. 18, 2003

Related U.S. Application Data

(63) Continuation-in-part of application No. 10/170,717, filed on Jun. 14, 2002, now Pat. No. 6,915,145.

(51) Int. Cl.
- *H04B 1/38* (2006.01)
- *H04M 1/00* (2006.01)
- *H02K 33/00* (2006.01)
- *H02K 21/12* (2006.01)

(52) U.S. Cl. .................. 455/573; 455/572; 455/574; 455/550.1; 455/575.1; 310/12; 310/15; 310/50.21; 310/156.21

(58) Field of Classification Search ............... 455/572, 455/574, 550.1, 575.1, 573; 310/12, 15, 310/50.21, 156.21
See application file for complete search history.

(56) References Cited

U.S. PATENT DOCUMENTS

| | | | |
|---|---|---|---|
| 3,696,251 A | 10/1972 | Last et al. | |
| 4,114,305 A | 9/1978 | Wohlert et al. | |
| 4,140,932 A | 2/1979 | Wohlert et al. | |
| 4,500,827 A | 2/1985 | Merritt et al. | |
| 4,709,176 A | 11/1987 | Ridley et al. | |
| 4,924,123 A | 5/1990 | Hamajima et al. | |
| 5,347,186 A | 9/1994 | Konotchick | |
| 5,363,445 A | 11/1994 | Shyu | |
| 5,818,132 A | 10/1998 | Konotchick | |
| 5,975,714 A | 11/1999 | Vetorino et al. | |
| 6,172,426 B1 | 1/2001 | Galich | |
| 6,242,827 B1 | 6/2001 | Wolf et al. | |
| 6,346,791 B1 | 2/2002 | Barguirdjian | |
| 6,570,273 B1 * | 5/2003 | Hazelton ................ 310/12 |
| 6,664,664 B1 * | 12/2003 | Botos et al. ............ 310/12 |

* cited by examiner

*Primary Examiner*—Matthew Anderson
*Assistant Examiner*—Yuwen Pan
(74) *Attorney, Agent, or Firm*—Bacon & Thomas, PLLC

(57) ABSTRACT

A portable telephone includes a telephone body containing telephone circuitry, a rechargeable cell, and a power generation device having a magnet structure, a coil, and a rectifier for generating a direct current (D.C.) voltage to charge the rechargeable cell. The magnet structure may be an armature and the coil may be fixed, or the magnet structure may be a stator and the coil may be movable. The magnet structure may be a multiple pole magnet made up of a plurality of individual pole structures, each pole structure including a pair of magnets joined to each other with facing poles of like polarity. In addition, the coil may include clockwise and counterclockwise windings arranged in a multi-layered stacked arrangement.

9 Claims, 8 Drawing Sheets

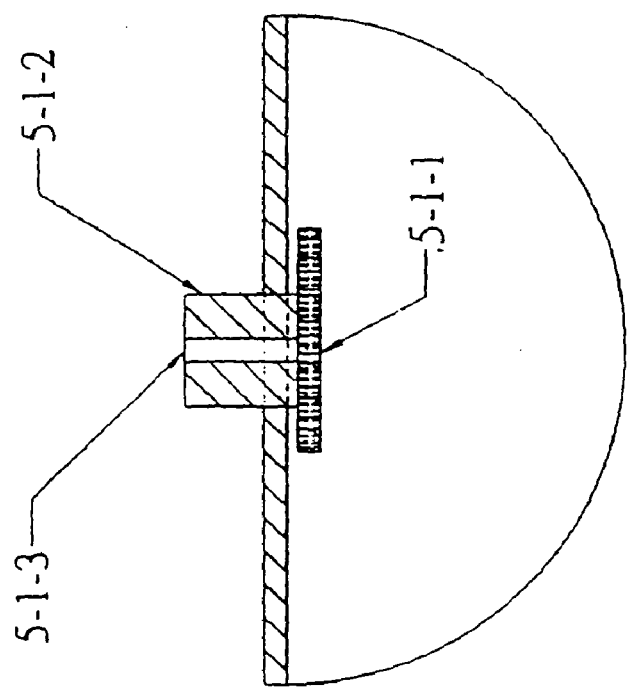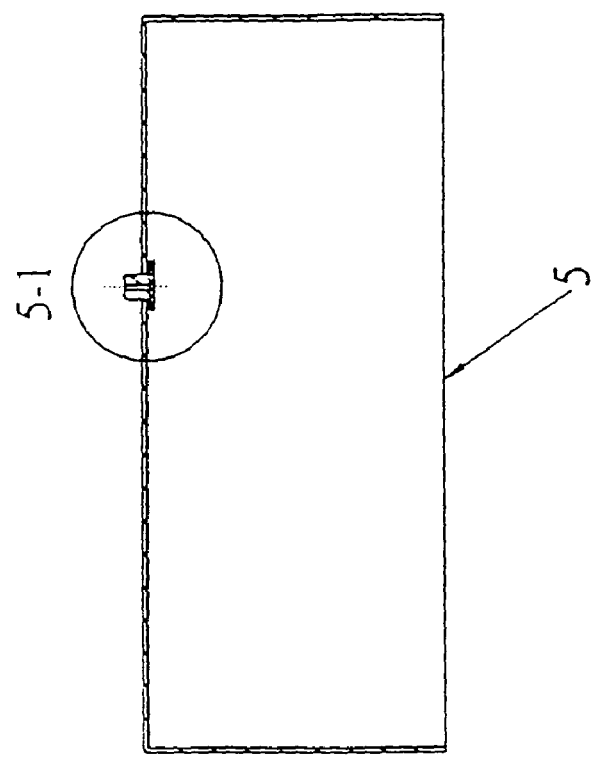
Fig. 5

SELF-RECHARGEABLE PORTABLE TELEPHONE

This application is a continuation-in part of U.S. patent application Ser. No. 10/170,717, filed Jun. 14, 2002 now U.S. Pat. No. 6,915,145.

BACKGROUND OF THE INVENTION

1. Field of the Invention

This invention relates to a self-rechargeable portable telephone, and more particularly to a self-rechargeable portable telephone/handset having a power generation device capable of converting mechanical energy resulting from movement of the telephone into electric energy and storing the electric energy in a battery cell.

In a preferred embodiment of the invention, the power generation device of the portable electric telephone includes a power generation device of the type described in copending parent U.S. patent application Ser. No. 10/170,717, including a fixed or movable coil, a corresponding movable or fixed magnet structure, a rectifier, and at least one of the following additional features:

A. The magnet structure including a series of N-S-N-S poles constructed using a novel joining method that overcomes problems of high remanance and coercivity, and thereby increases flux density;

B. The stationary or movable coil including windings constructed using a novel winding method that results in maximum magnetic lines cutting in linear motion.

2. Description of Related Art

Typically, portable telephones used for wired and wireless communications employ a disposal non-rechargeable primary cell or a rechargeable secondary cell that must be recharged through an external charging device.

In copending U.S. patent application Ser. No. 10/170,717, it was proposed to provide a portable telephone having an internal generator arranged to provide charging current to a secondary cell upon movement of the telephone, thereby enabling the use of environmentally-friendly secondary cells without the need for an external charging device. In addition to eliminating the inconvenience of battery. disposal or charging, the proposed portable telephone offered advantages of energy conservation and pollution reduction due to elimination of the need to draw charging power from the public power grid.

Although showing great promise, a problem with implementation of the self-rechargeable telephone has been the relatively low magnetic efficiency of suitable sized and priced magnets and coils, which typically have a relatively low flux density and/or provide an inefficient distribution of magnetic lines. Although more efficient magnets or magnet structures are known, such as the rare earth magnets disclosed in U.S. Pat. Nos. 5,347,186 and 5,818,132; the composite armature and multiple coil structure of U.S. Pat. No. 4,500,827; the wound magnetic core disclosed in U.S. Pat. No. 4,709,176; or the composite coil and stack neodymium disc magnets disclosed in U.S. Pat. No. 5,975,714, they are generally expensive to manufacture and/or too large for the applications mentioned above. Further, while distribution of magnetic lines from a coil can be improved by adding a permeable material to the coil structure, the permeable material has the disadvantage not only of adding to the complexity of the structure, but also to the diamagnetic resistance effect.

SUMMARY OF THE INVENTION

It is accordingly a first objective of the invention to provide a portable telephone that is convenient to use and energy efficient.

It is a second objective of the invention to provide a portable telephone that does not require an external source of charging power.

It is a third objective of the invention to provide a portable telephone having a linear electric generator that can be easily manufactured and yet that is more compact and efficient enough to be used as a recharging power source, thereby reducing demand on the electrical power grid with consequent reductions in energy consumption and pollution.

These objectives are achieved, in accordance with the principles of a preferred embodiment of the invention, by a portable telephone having a power generation device capable of converting mechanical energy resulting from movement of the telephone into electric energy and storing the electric energy in a battery cell.

In a preferred embodiment of the invention, the portable telephone includes a telephone body containing telephone circuitry for receiving and transmitting data signals, including voice signals, a rechargeable cell, a power generation device having a movable or fixed magnet structure, a corresponding movable or fixed coil, and a rectifier for generating a direct current (D.C.) voltage to charge the rechargeable cell, and at least one overload protection control device for protection of the telephone circuitry and the rechargeable cell.

The magnet structure of the preferred embodiment may be a multiple pole armature made up of individual magnetic pole structures arranged in series to reciprocate linearly within the coil. Each of the individual magnetic pole structures is constructed of pairs of magnets joined by an adhesive material, or by bonding, welding, sintering, soldering, or the like, applied to a planar surface of at least one of the magnets such that like poles of the two magnets in the pair face each other. Pole structures of alternate polarity are then joined at ends of the respective magnets to form a rectangular parallelepiped shaped multiple pole magnet. The flux density within such an armature magnet structure has been found to be substantially higher than that of a corresponding conventional four pole magnet structure.

In addition, the coil of the preferred embodiment may optionally include a multiple winding structure that includes at least one first clockwise winding and at least one second counterclockwise winding in a multi-layered stacked arrangement that maximizes passage of the magnetic lines through the armature and facilitates the distribution of the lines to maximize interaction with flux in the armature and thereby generate maximum energy. The multiple-winding coil may include a permeable flux guiding structure, although an air core may also be used.

Although the illustrated embodiment of the invention includes a multiple pole armature and a fixed coil, those skilled in the art will appreciate that the multiple pole armature and fixed coil could easily be replaced by a multiple pole stator structure and a movable coil, as described for example in copending U.S. patent application Ser. No. 10/410,160, Inventors Yu-Ta TU and Show-Jong YEH, filed concurrently herewith.

BRIEF DESCRIPTION OF THE DRAWINGS

FIGS. 3–5 are exploded schematic drawings showing a partial structure of FIG. 1.

DETAILED DESCRIPTION OF THE PREFERRED EMBODIMENTS

Figure 1:
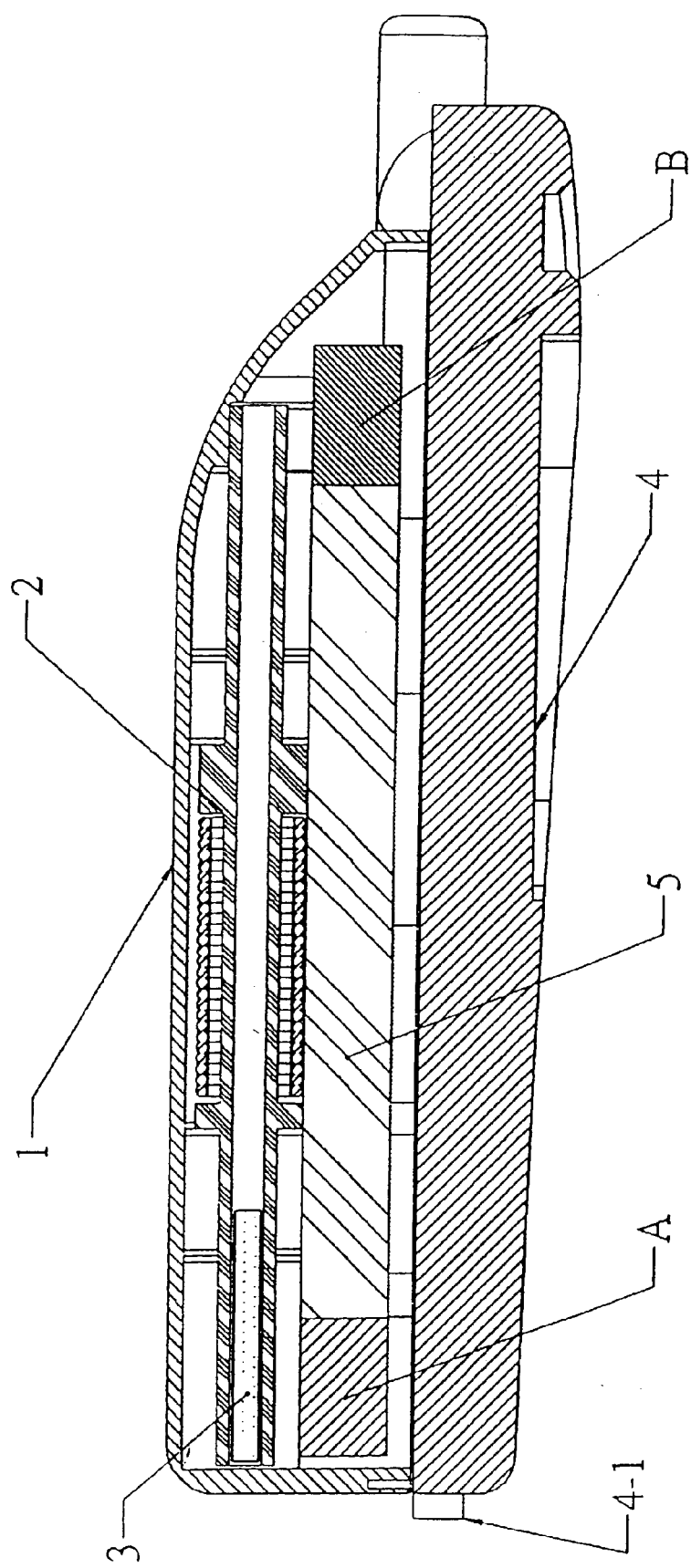
FIG. 1 is a section view showing a structure of a self-rechargeable portable telephone in accordance with a preferred embodiment of the invention.

Referring to FIG. 1, a portable telephone includes a portable telephone body 4; a rechargeable cell 5 having a casing 1; a power generation device made up of a coil 2, armature 3, and a rectifier including in a first overload protection control device A; and a second overload protection control device B arranged in the casing 1 of the cell 5.

Figure 2:
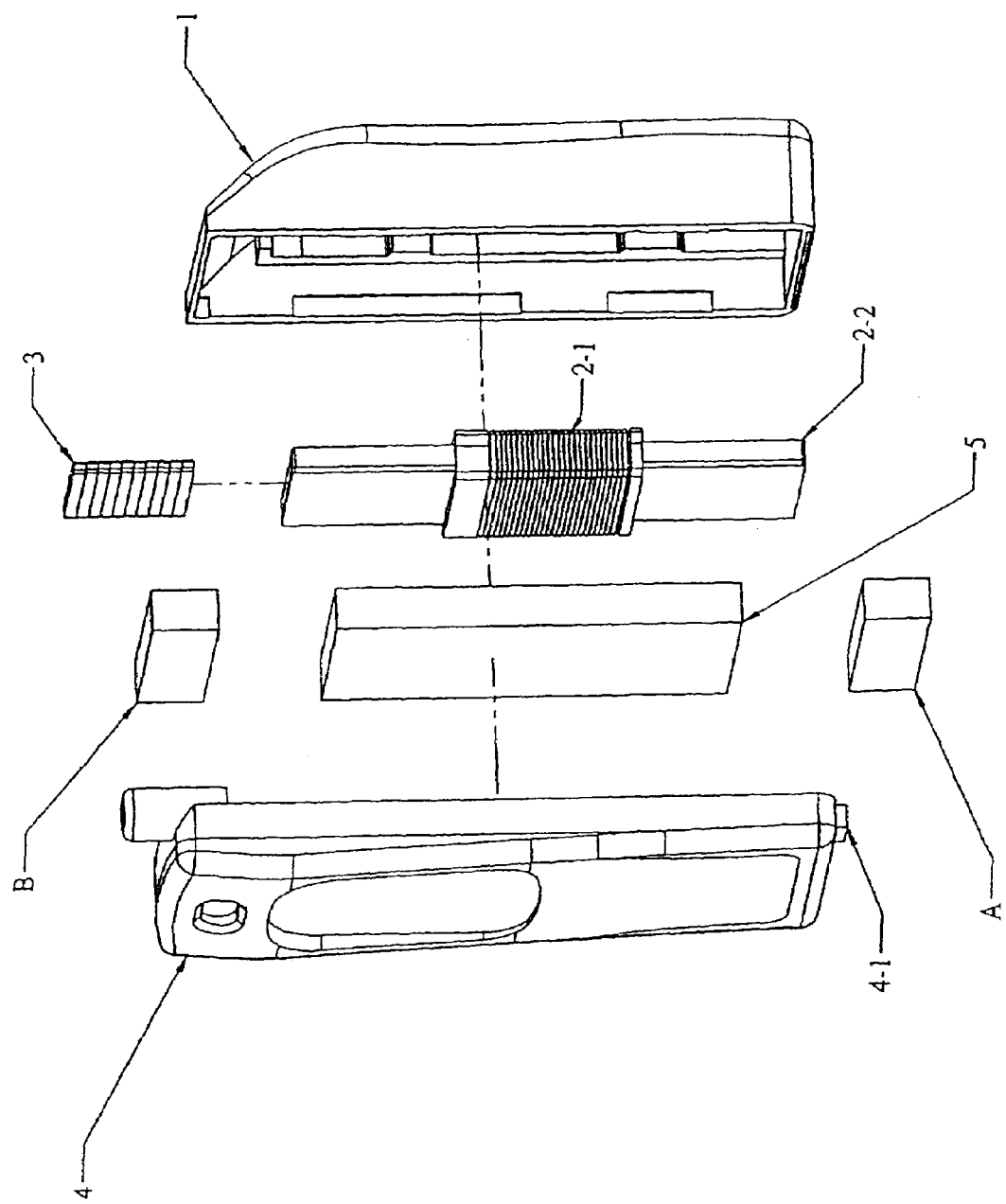
FIG. 2 is an exploded schematic drawing showing an overall structure of FIG. 1.

As shown in FIG. 2, the portable telephone body 4 includes circuitry for receiving and transmitting data signals such as sound. Preferably, the portable telephone body is provided with a socket plug 4-1 for externally connecting to a power supply. The power generation device has a magnetic body 3 and a coil winding 2. The coil winding 2 includes at least one coil 2-1 which is wound on a support 2—2. According to Faraday's Law and Lenz's Law, the coil winding may generate a direct current (D.C.) voltage by reciprocally moving the armature magnet 3 inside the support 2-2 to induce an alternating current (A.C.) voltage, and by rectifying the alternating current voltage. The armature 3 includes a permanent magnetic material, while the coil 2-1 may include either a permeable material or an air core, or a combination of a permeable material and air core.

The power generating device may include force accelerating elements (not shown) such as resilient elements, in the form of springs or rubber element, magnetic materials or systems, or a machine, device or system for applying a rebounding or repulsive force.

Figure 3:
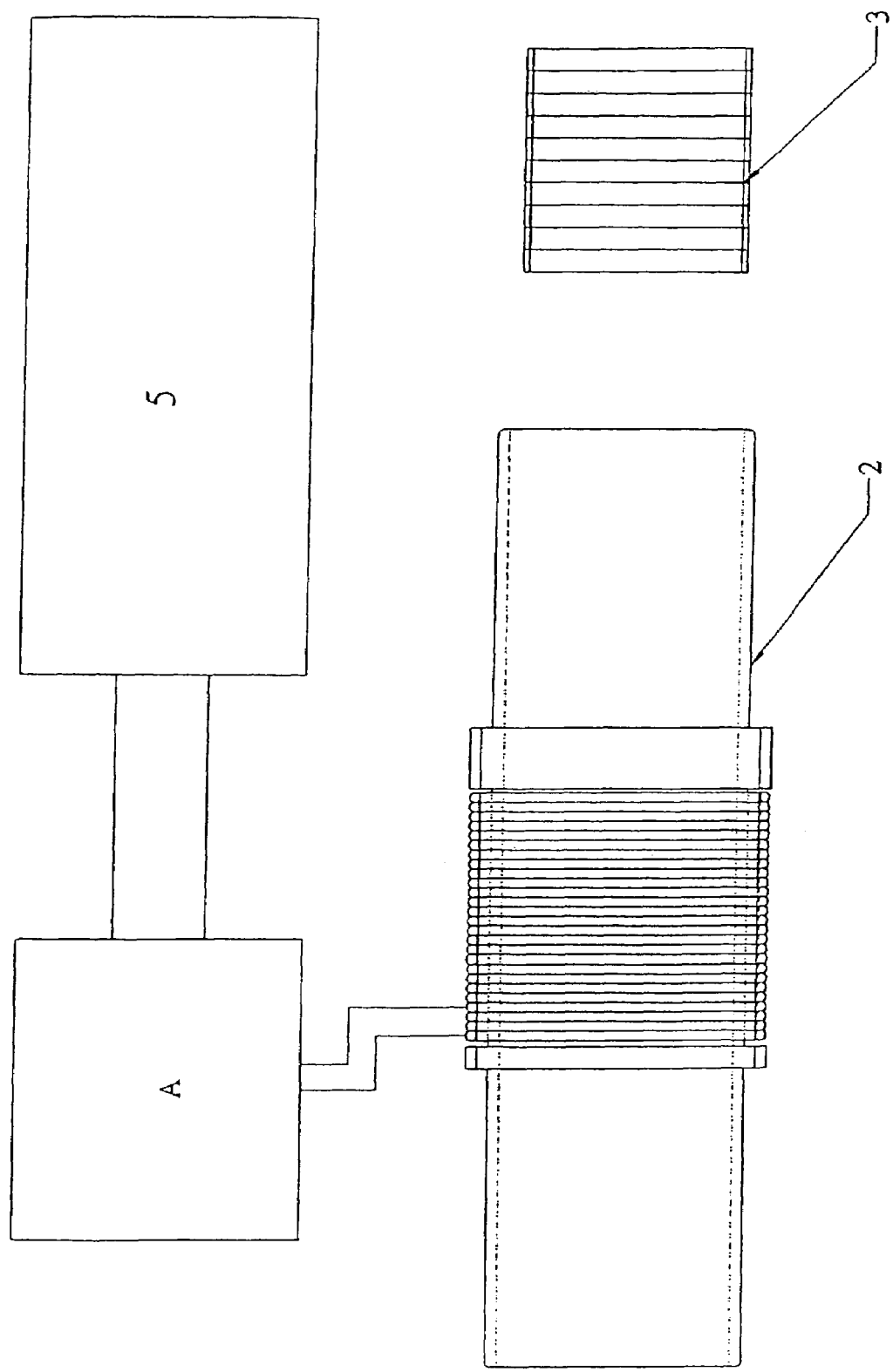
Figure 4:
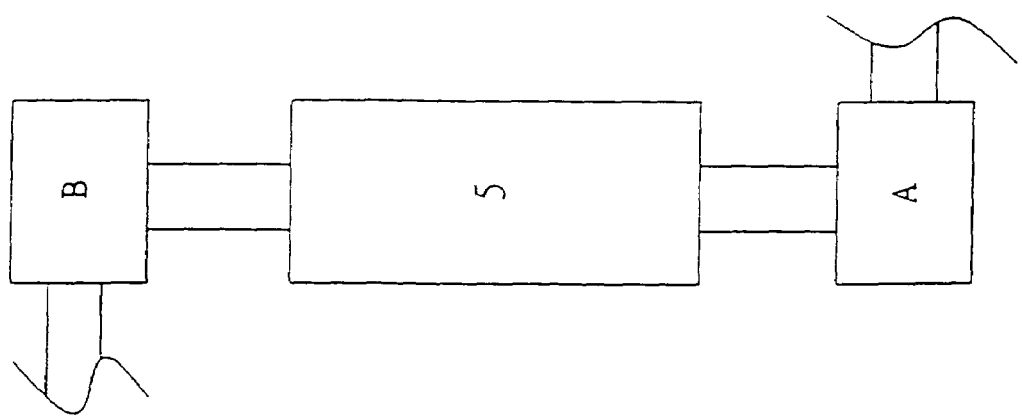

The generated D.C. voltage is supplied to the cell 5, as shown in FIG. 1, via an overload protection control device/rectifier A, as shown in FIGS. 3 and 4.

As shown in FIG. 4, the cell 5 can supply the stored D.C. voltage to the portable telephone circuitry in portable telephone body 4 such that the telephone circuit may be operated.

As shown in FIG. 5, the cell 5 is provided with a ventilation regulator 5-1 that has an air/liquid separator 5-1-1, plug 5-1-2 and a ventilation hole 5-1-3 for preventing the liquid in cell 5 from leaking and for allowing air to be ventilated freely. However, the invention is not limited to a particular type of cell and may use any kind of rechargeable cell such as a secondary cell.

Figure 6:
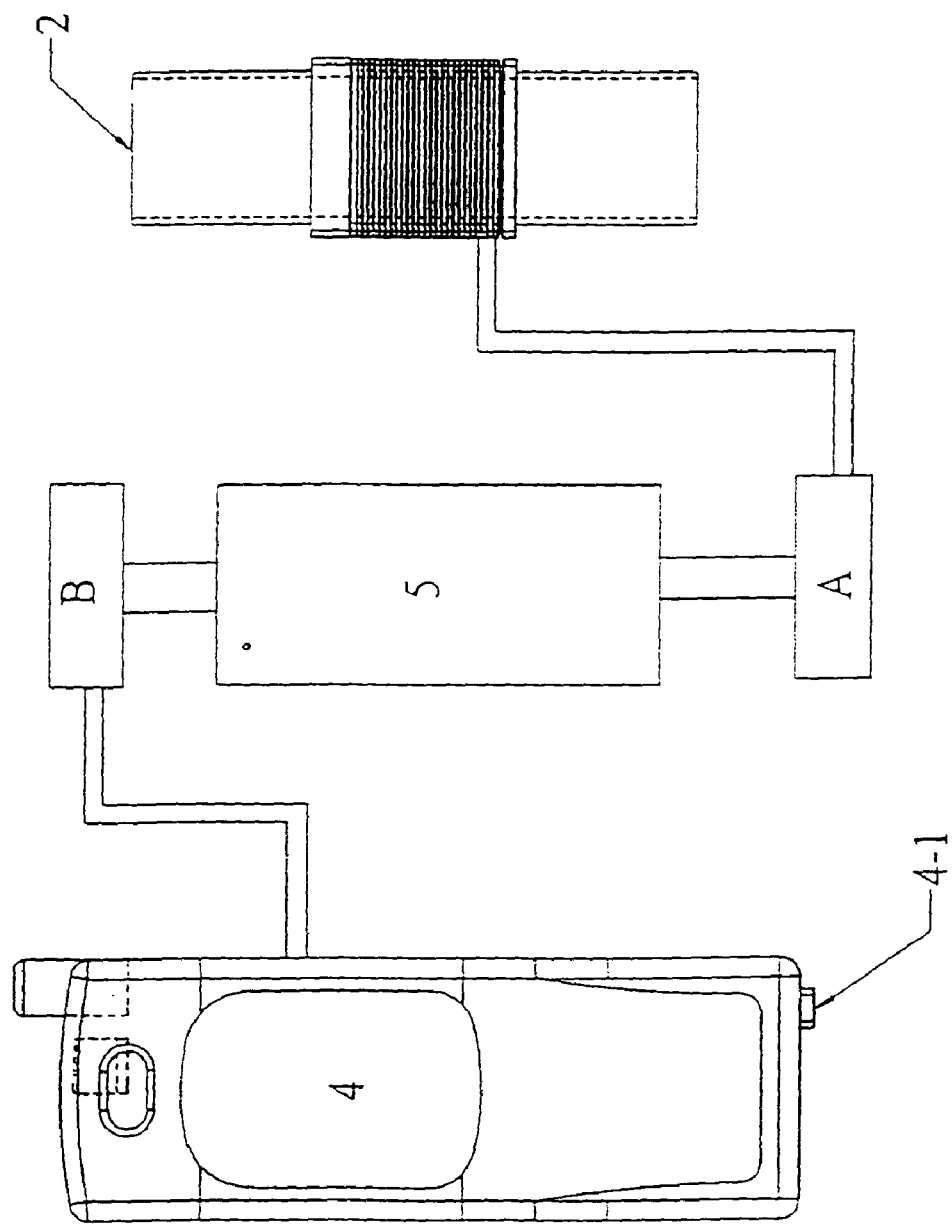
FIG. 6 is a schematic drawing showing a wiring structure of FIG. 1.

FIG. 6 shows a wiring structure of FIG. 1 in detail. A description of each portion has been illustrated above and will thus be omitted here.

Optionally, a connector may be provided to permit recharging of the battery through an external power source such as a recharger, in addition to the self-recharging described above. In that case, overload protection device B may include a second rectifier to permit it to be used for charging.

To maximize generating efficiency, a plurality of generators aligned along different axes may be included in the telephone body. For example, three generators aligned along mutually perpendicular x, y, and z axes may be provided.

Figure 7:
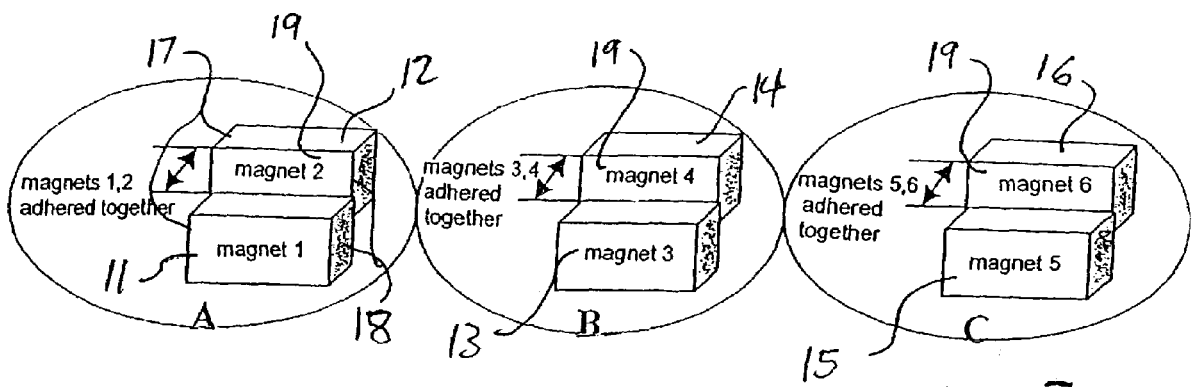
FIG. 7 is a schematic diagram illustrating the construction of a multiple pole armature magnet for the portable telephone of FIG. 1.
Figure 8:
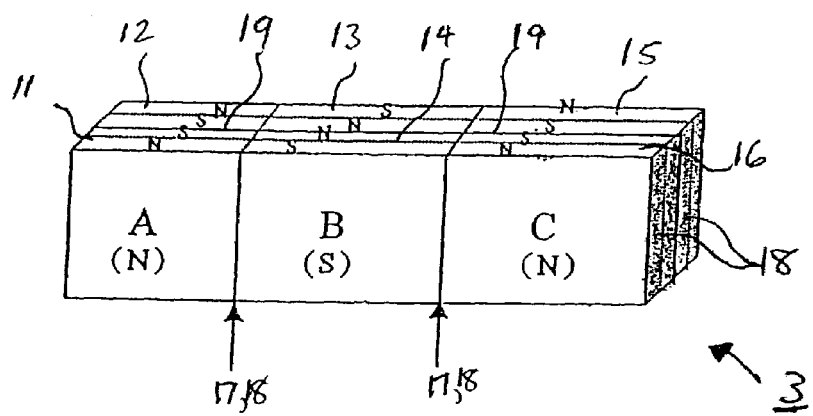
FIG. 8 is a schematic diagram of a multiple pole armature magnet constructed using the method illustrated in FIG. 7.

Referring to FIGS. 7 and 8, armature 3 is preferably made up of serially connected dipole magnets and/or alternating single pole structures. The alternating pole structures may be made by magnetizing a metal core, or in a preferred method by joining separately magnetized pole structures, although the invention is not limited to a particular method of making the alternating pole structures, but rather may encompass any suitable method. The pole structures are preferably constructed of series-connected pairs of magnets 11,12; 13,14; and 15,16. Each pair of magnets 11,12; 13,14; and 15,16 consists of two individual parallelepiped-shaped dipole magnets having ends 17,18 and laterally oriented opposite magnetic poles N,S between the ends. Each magnet in a pair is joined to the other member of the pair by, for example, coating or applying an adhesive material on at least one lateral face 19 of one of the magnets, or by any other suitable joining method, including bonding, welding, soldering, or sintering or by any combination of two or more such joining methods, such that like poles of the respective magnets face each other. A pair having facing north poles will form a south pole of the combined serial-connected armature magnet 3, while a pair having facing south poles will form a north pole of armature magnet.

As shown in FIG. 8, the pairs of magnets 11,12; 13,14; and 15,16 are joined together in series by joining respective ends 17,18 of the magnets together to form the multiple pole magnetic armature 3, for example by adhering, bonding, welding, soldering, or sintering the respective ends, or by any combination of two or more such joining methods. As indicated above, it has been found that the flux density of the illustrated multiple pole magnet structure is substantially higher than that of a multiple magnet structure that is not constructed of pairs of individual magnets in the illustrated manner.

Figure 9:
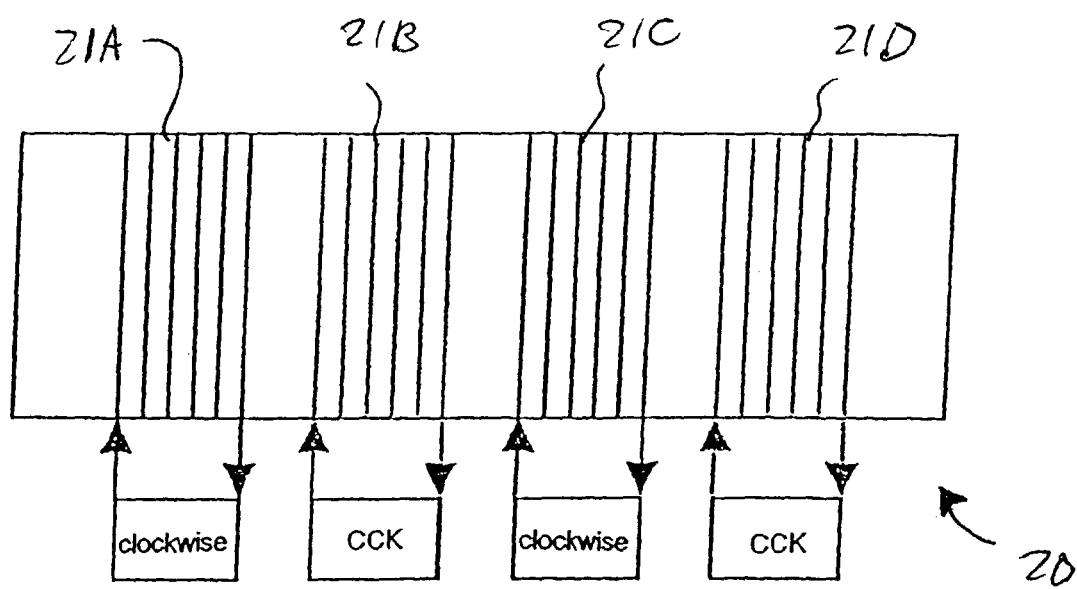
FIG. 9 is a schematic diagram of a multiple winding arrangement for the portable telephone of FIG. 1.

The corresponding stator windings 20 of the power generation device form an air core coil in which adjacent windings are wound in opposite directions in order to magnetically interact in a most efficient manner with the opposite poles of the armature 3. In particular, as illustrated in FIG. 9, a first winding 21A may be wound in a clockwise direction, a second winding 21B may be wound in a counterclockwise direction, each of said windings is formed in at least one layer of a multi-layered stacked arrangement, and said windings have at least one winding, when viewed along an axis of the coil, a third winding 21C may be wound in a clockwise direction, and a fourth winding 21D may be wound in a counterclockwise direction. The spacing and number of windings 20 can easily be adjusted depending on the spacing and number of poles of the respective armatures 3 to optimize distribution of magnetic lines for a simulated motion of the armatures in order to achieve an ideal magnetic line cutting efficiency and maximum energy output for the generator. In order to avoid the occurrence of undesired magnetic resistance, the windings 2 may form an air core, although it is also within the scope of the invention to provide some type of permeable flux guide associated with the multiple windings.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention. For example, in constructing the multiple pole armature magnet of the power generation device from pairs of individual dipole magnets, the individual dipole magnets and pairs of dipole magnets may, as explained above, be joined together by means other than the use of adhesives, such as by welding, soldering, bonding, sintering, or the like, or by any combination of two or more such joining methods. In addition, the number of magnetic pole structures may be any number greater than one, i.e., at least two. Finally, it will be appreciated that the multiple pole armature and fixed stator coil may be replaced by a multiple pole magnetic stator and a movable coil. It is therefore intended that the invention not be limited by the above description or accompanying drawings, but that it be defined solely in accordance with the appended claims.

We claim:

1. A portable telephone, comprising:
   a portable telephone body including telephone circuitry;
   a power generation device including a magnet structure, coil winding, and rectifier for generating direct current voltage upon movement of the telephone;
   a rechargeable cell, capable of recharge by using said direct current voltage; and
   at least one overload protection control device for protection of the telephone circuitry and rechargeable cell,
   wherein said D.C. voltage generated by the power generation device is obtained by causing reciprocal movement of the telephone to induce electric current in the coil winding, and by rectifying the electric current, and
   wherein said magnetic pole structures each comprises a pair of parallelepiped shaped dipole magnets having two ends and lateral faces, said dipole magnets in said pairs being joined together at said lateral faces such that like poles face each other, and said pairs being joined together at said ends of said individual dipole magnets to form said magnetic pole structures.

2. A portable telephone as claimed in claim 1, wherein said individual dipole magnets are joined by an adhesive.

3. A portable telephone as claimed in claim 1, wherein said individual dipole magnets are joined by welding or soldering.

4. A portable telephone as claimed in claim 1, wherein said individual dipole magnets are joined by sintering.

5. A portable telephone as claimed in claim 1, wherein said individual dipole magnets are joined by bonding.

6. A portable telephone as claimed in claim 1, wherein said magnetic pole structures are joined together by an adhesive.

7. A portable telephone as claimed in claim 1, wherein said magnetic pole structures are joined by sintering.

8. A portable telephone as claimed in claim 1, wherein said magnetic pole structures are joined by bonding.

9. A portable telephone, comprising:
   a portable telephone body including telephone circuitry;
   a power generation device including a magnet structure, coil winding, and rectifier for generating direct current voltage upon movement of the telephone;
   a rechargeable cell, capable of recharge by using said direct current voltage; and
   at least one overload protection control device for protection of the telephone circuitry and rechargeable cell,
   wherein said D.C. voltage generated by the power generation device is obtained by causing reciprocal movement of the telephone to induce electric current in the coil winding, and by rectifying the electric current, and
   wherein said coil includes a plurality of windings being wound in alternating clockwise and counterclockwise directions when viewed in a direction of said axis, each of said windings being formed in at least one layer of a multi-layered stacked arrangement, and said windings have at least one winding.

* * * * *